Oct. 6, 1931.   A. O. JAEGER   1,826,548
CATALYTIC APPARATUS
Filed July 24, 1926   9 Sheets-Sheet 1

INVENTOR*S*
ALPHONS O. JAEGER

BY Newell + Spencer
ATTORNEY*S*

Oct. 6, 1931.  A. O. JAEGER  1,826,548

CATALYTIC APPARATUS

Filed July 24, 1926   9 Sheets-Sheet 3

Fig. 9

Oct. 6, 1931.   A. O. JAEGER   1,826,548
CATALYTIC APPARATUS
Filed July 24, 1926   9 Sheets-Sheet 8

Fig. 13.

INVENTORS
ALPHONS. O. JAEGER
BY
Newell + Spencer
ATTORNEYS

Patented Oct. 6, 1931

1,826,548

UNITED STATES PATENT OFFICE

ALPHONS O. JAEGER, OF ST. LOUIS, MISSOURI, ASSIGNOR TO THE SELDEN COMPANY, OF PITTSBURGH, PENNSYLVANIA, A CORPORATION OF DELAWARE

CATALYTIC APPARATUS

Application filed July 24, 1926. Serial No. 124,569.

This invention relates to methods and apparatus for carrying out vapor phase catalytic reactions and particularly to methods and apparatus for carrying out highly exothermic vapor phase catalytic reactions requiring a delicate temperature control and this is particularly true in the case of many strongly exothermic reactions such as for example, a number of organic oxidations and reductions. This has necessitated provision for accurate temperature control as, if the temperature of the whole of the catalyst is not properly controlled, there is a tendency for portions of the catalyst to become overheated or to be at too low a temperature, which results in undesired side reactions, lowering of the yield and in many cases, rapid destruction of the catalyst. The problem is complicated still further by the fact that many, if not most vapor phase catalytic reactions, take place with a velocity which is largely determined by the concentration of the reacting ingredients. As a result, there is a strong tendency for a large proportion of the reaction to take place in the portion of the catalyst which comes in contact with relatively fresh reaction gases in which the concentration of reacting ingredients is relatively high. In the case of exothermic reactions this results in a hot spot or hot zone, at or near the catalyst surface which first encounters the reaction gases. When such overheating results in catalyst destruction, as is the case with many catalysts, the zone of greatest reaction and correspondingly highest heat tends to wander, as the catalyst becomes progressively deteriorated so that the deterioration is not restricted to a relatively small zone or amount of catalyst but in many cases tends to gradually progress throughout the whole of the catalytic charge, with resulting serious losses in catalyst, reductions in yields, production of impurities and the like.

In the past various methods have been proposed to overcome the tendency of catalytic reactions to become uncontrollable. Thus, for example, in some well known types of converters relatively thin catalyst layers of very large area are used and sometimes a number of succeeding layers alternate with air spaces or the like. Converters of this type are fairly effective in controlling temperature in some cases but are open to very serious disadvantages in that the thin catalyst layer tends to blow through in spots and the converters take up a very large amount of room which is frequently a serious disadvantage, as in many plants space is at a considerable premium. The large size of the converters also increases the expense of installation.

Tubular converters have also been used and when the tubes are very small in cross section and an efficient cooling bath surrounds the tubes this type of converter can be operated with fair success. As soon, however, as the diameter of the converter tubes is increased, cooling troubles at once set in because the periphery of the catalyst column is strongly cooled by the cooling medium surrounding the tubes, whereas the cooling toward the center of the catalyst column is relatively slight, as most catalyst are in the form of more or less loose granules or fragments and are not good conductors of heat, both by reason of their shape and due to the fact that many of the catalyst compounds themselves have a relatively low heat conductivity. Tubular converters are therefore limited to relatively small tubes when they are to be used in strongly exothermic reactions or in reactions which require a very delicate temperature control. Converters containing large numbers of small diameter tubes are, of course, relatively expensive to build and involve a very large number of joints which, in most cases, must be made fluid-tight, as cooling baths of various liquids are quite generally used in order to effect vigorous cooling.

It is the object of the present invention to avoid the difficulties inherent in temperature control of catalytic reactions in converters which have been used hitherto and to effect catalyses under uniformly and readily controlled temperature conditions and in apparatus which is neither expensive or unduly complicated. Other and further objects and advantages of the invention will appear from the description which follows and will be clear to those skilled in the art.

According to the present invention in its broader aspects catalyses are carried out in tubes which are closed at one end instead of being open at both ends, as in the conventional tubular converter, which tubes are filled with catalyst and contain one or more concentric tubes projecting into the catalyst. In general, the catalyst is therefore, for the most part, charged into the annular space between the inner tubes and the outer converter tubes. Reaction gases are passed down through the inner tube or tubes and pass out into the catalyst and upwardly through it. The outside of the closed catalyst tubes is cooled by means of cooling baths or air or by embedding in materials of high heat conductivity such as metals and the like. Obviously of course, instead of cooling the media surrounding the tubes may be used as heating media where the reactions demand it and in the descriptions to follow it should be understood that the invention is not restricted to converters in which the reaction is to be cooled but includes also converters in which the reaction must be heated.

By means of the present invention therefore, the outside of the annular catalyst layer is cooled by a cooling bath or by other efficient cooling medium, while the inside of the annular catalyst layer is cooled by the incoming gases which pass down through the concentric inner tube or tubes. This effects a very even, powerful and easily regulated cooling since the outer periphery of the annular catalyst layer which, of course, is of the greatest extent, is cooled by media which may be of high heat absorbing capacity, whereas the inner surface of the catalyst which is of smaller area is effectively cooled by the incoming gases which are in general, of lower heat capacity than the cooling bath but which correspondingly have to cool a smaller catalyst area. Not only is the catalyst effectively cooled by the present invention but the reacting gases are gradually and progressively heated and pass into the catalyst from the inner tube at a temperature which is conducive to the best reaction. The length, cross section, etc., of the gas inlet tubes, of course, will be proportioned to effect the desired amount of cooling of the catalyst and heating up of the gases and must be chosen with due regard to the requirements of any given catalytic reaction to be carried out.

While in its broader aspects the present invention contemplates passing reaction gases down through a tube into a roughly annular catalyst layer and upwardly thereafter and at the same time cooling the catalyst by an external cooling medium, in more specific aspects the invention includes the provision of a plurality of inner tubes which may provide for a mixture of reaction gases or which may provide in some of the preferred embodiments of the present invention, for the introduction of reaction gases and also for the circulation of cooling gases entirely out of contact with the catalyst. Numerous other modifications are possible in specific cases and some of these modifications which are of importance in many particular installations are shown in the drawings and will be described in connection therewith but it should be clearly understood that the invention is not limited to the embodiments and modifications illustrated in the drawings which merely show a few of the many possible applications of the principles of the invention. The drawings are entirely diagrammatic in character, as the particular structural construction of the converters for use in any particular installation will be governed by the conditions of the installation and do not per se form any part of the present invention except in so far as they are necessary to carry out the novel features of the invention.

In the above description concentric inlet tubes have been referred to and in general it is better and structurally more satisfactory to use circular tubes with concentric arrangement. The particular cross sectional shape of the tubes does not, however, form any part of the present invention and where it may be desirable other shapes and other arrangements may be used. In general, however, I prefer tubes of circular cross section, concentrically arranged, as this presents the simplest and, in many ways, the most satisfactory mechanical embodiment of the present invention.

Figure 1:
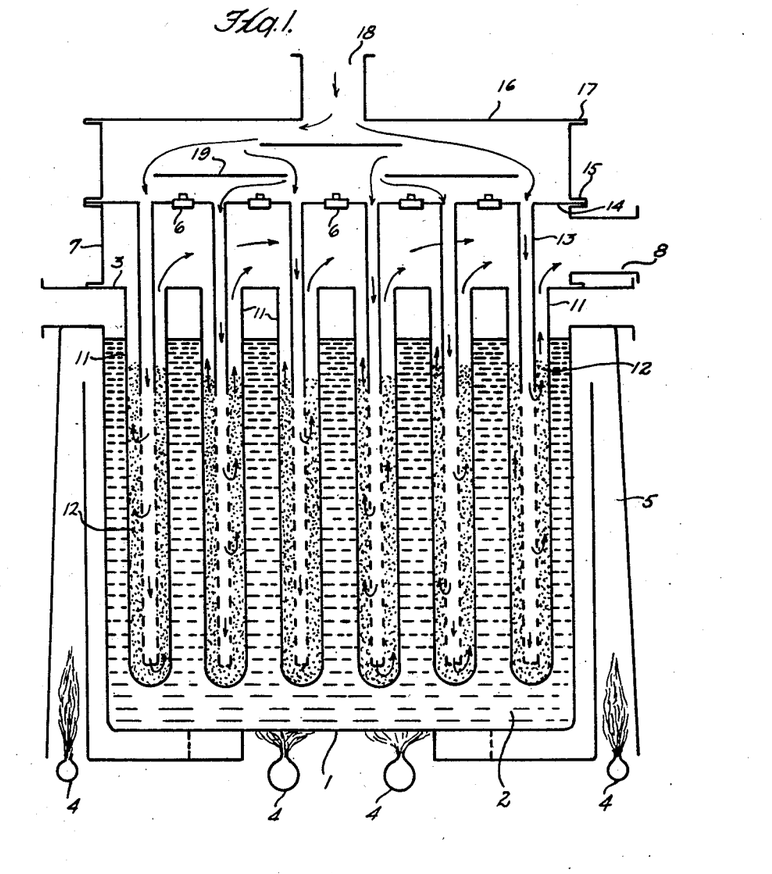
Figure 1 is a cross section through a converter showing a single perforated inlet tube in each catalyst tube.

In the converter shown in Figure 1 catalyst tubes 11 are shown as filled with catalyst 12 and mounted in the converter ceiling 3. The tubes project into converter shell 1 and are surrounded by the cooling bath 2. External heating means are shown consisting in burners 4 and heating passages 5. Perforated inlet tubes 13 are mounted in a supporting plate 14 which is joined to the converter shell structure by means of the flanges 15. A top plate 16 fastened to the converter shell by the flanges 17 and provided with an inlet passage 18 forms with the plate 14 a gas inlet chamber which is provided with suitable baffles 19. Plugs 6 close openings in the plate 14 which provide holes for the introduction of catalyst into the tubes 11. The plates 3 and 14 and the converter shell segment 7 define an outlet gas space which is further provided with an outlet main 8.

In the operation of the converter, gas enters through the main 18 and passes down through the tubes 13 emerging through the perforations whence it passes upwardly through the catalyst 12 into the exit gas space and thence out through the exit main 8. It will be seen that the incoming gas serves to cool or to heat the inner surfaces of the annular catalyst columns, whereas the outer surfaces of these columns are cooled or heated by means of the bath 2. The number and position of the perforations in the tube 13 will, of course, vary with the reaction which is to be carried out and should be chosen in each case so as to provide the desired cooling or heating effect. It will be clear that instead of perforations the tubes 13 may be made solid and provided with an open end at the bottom where such a construction is desirable. In general, however, a perforated tube is preferable where only a single inner tube is used, as the fresh gases are distributed over a much larger catalyst layer and there is correspondingly less tendency to form a hot spot or zone.

Figure 2:
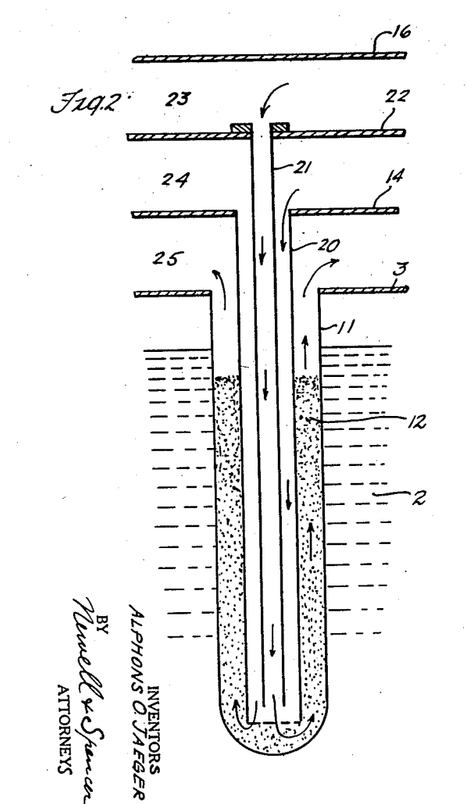
Figures 2 to 8 are vertical cross sections of single catalyst tubes illustrating a plurality of concentric tubes.

Figure 2 shows a tube construction which is somewhat different from that of Figure 1 and is provided with two concentric gas inlet tubes 20 and 21 necessitating an additional ceiling plate 22 which with the top plate 16, the bottom plate 3 and the intermediate plate 14 forms three separate gas compartments 23, 24 and 25. Compartments 23 and 24 are compartments for separate inlet gases or for separate portions of the inlet gas and compartment 25 is an outlet compartment similar to that in Figure 1. The catalyst 12 is placed in the same manner as in Figure 1.

The operation of the tube is clearly shown by the arrows, the two incoming gases, which may be the same kind of gas or different gases and which may be at the same or different temperatures, pass downwardly and out through the bottom of the tubes 20 and 21, whence they flow upwardly through the catalyst. It will be seen that the catalyst is cooled on its outer surface by the bath 2 and on its inner surface by the incoming gas from the compartment 24. This latter is heated up and enters the catalyst at the bottom of the tube at a relatively high temperature. Overheating of the catalyst due to too violent reaction by the hot gas is prevented by the fact that at the point of exit the heated gas is mixed with the cold gas from compartment 23 which passes down through tube 21 and is heated only a little, if at all. By suitable regulation of the temperature of the two incoming gases a very accurate regulation of reaction speed and reaction temperature may be effected.

Figure 3:
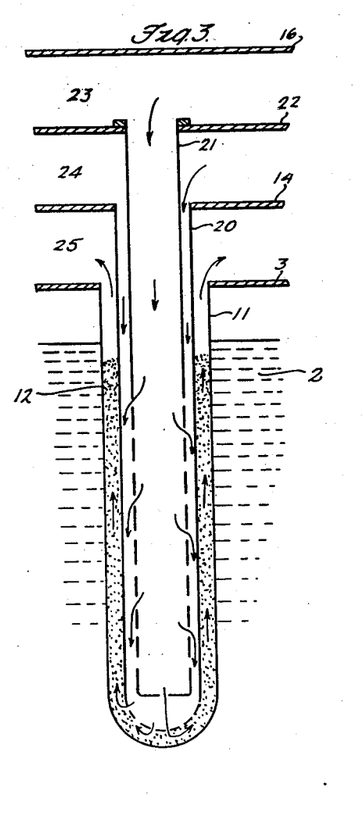

Figure 3 illustrates a tube similar to that shown in Figure 2 but the inner gas tube 21 is provided with perforations so that the gas coming from the compartment 23 is gradually mixed with the gas coming from the compartment 24 before both gases enter the catalyst at the bottom of the catalyst tube. As there is a constant influx of cold gas from the central tube the cooling effect on the inside surface of the catalyst in the lower portion of the tube is considerably greater than in the construction shown in Figure 2 and for strongly exothermic reactions this construction presents considerable advantages as the tendency to heating will be greater in the lower portion of the catalyst tube which encounters the fresh gases and therefore it is desirable to effect a more thorough cooling in this zone. A more thorough mixture of the reaction gases is also effected and where the gases are different this is advantageous as it results in a more homogeneous mixture.

Figure 4:
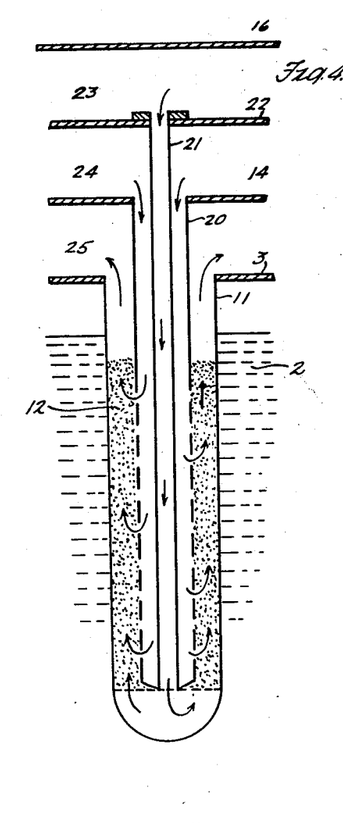

In the construction shown in Figure 4 the tube 20 is perforated so that the gases in this tube do not enter the catalyst at one spot but contact with the catalyst over a relatively large area which is desirable in many cases in order to bring about a more effective and rapid reaction and to prevent local overheating. The cooling gases passing down through tube 21 serve to cool the gases in tube 20 and to prevent undue rise in temperature of these gases before they enter the catalyst. The perforations in tube 20 must, of course, be arranged in order to effect the desired distribution of gases and they should end a considerable distance below the upper catalyst level as it is necessary for the gases emerging from the upper perforations to pass through a certain minimum thickness of catalyst in order to give sufficient time for satisfactory reaction. This is particularly true in the case of the present invention since the gases passing out through the upper perforations are relatively cooler than those passing out through the lower perforations as they have not been in contact with the hot catalyst for as long a period. The temperature of the incoming gases very markedly affects the speed of reaction and hence care should be taken to provide sufficient catalyst height so that even the gases passing out through the upper perforations react completely. In the drawings the perforations are shown as approximately the same size but in practice it will usually be necessary to make the lower perforations either larger or more numerous in order to effect a satisfactory gas distribution as the resistance to passage through the longer catalyst layer from the lower perforations tends to force gas out through the upper perforations and the perforation size and number must be chosen to counteract this tendency sufficiently so as to prevent an uneven distribution.

Figures 5, 6:
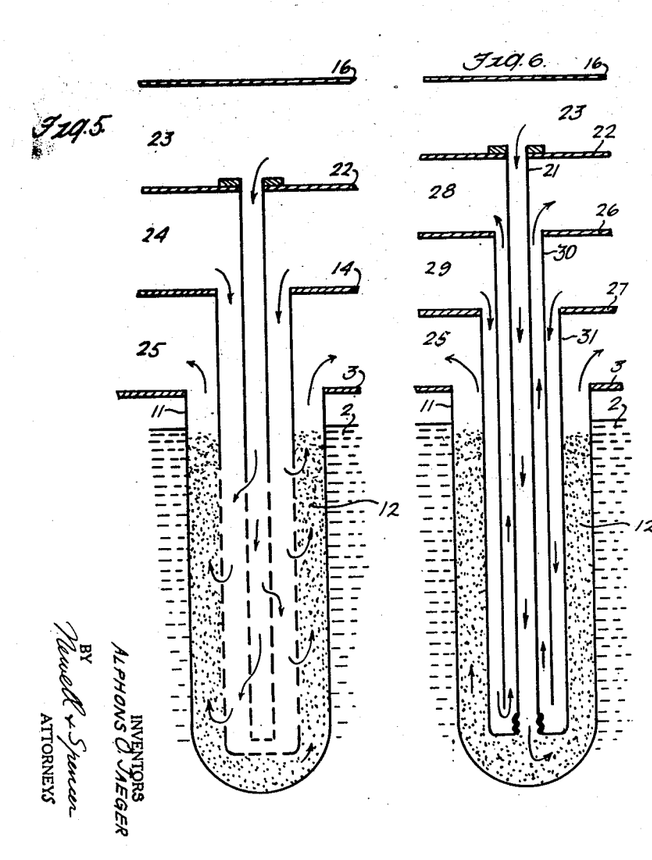

Figure 5 shows a construction which is very similar to that of Figure 4 except that the inner tube 21 is also perforated. This construction is of advantage in many cases as the gases are mixed before entering the catalyst and there is no tendency for a large volume of cold gases to strike any particular catalyst zone, as might sometimes occur in the construction shown in Figure 4 if the gases entering through the pipe 21 are too cold. A more even temperature control is also effected by the gradual mixing of the gases in tubes 20 and 21 and this is advantageous in providing for an even cooling. It is also possible with the construction shown in Figure 5 to use gases of different composition and to effect mixing before they pass through the catalyst, whereas the construction shown in Figure 4 is primarily suitable for gases of the same composition or at least having the same reactive ingredients. The arrangement and size of perforations must be chosen to effect even distribution, as has been described in connection with Figure 4.

Figure 7:
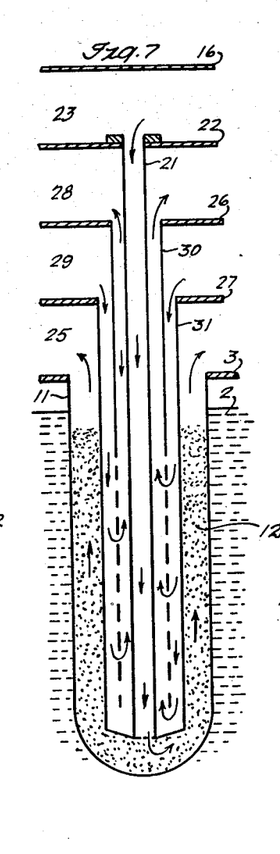

Figures 6 and 7 show a further modification of the cooling principles of the present invention. Instead of circulating the reaction gases in heat-exchanging relation with the catalyst itself a cooling gas is introduced between the catalyst and the incoming reaction gases, the cooling gas being in heat-exchanging relation both with the catalyst and the incoming gases but not contacting with either. In the figures the intake gas passes in from the space 23 through the tube 21 up through the catalyst and then out through the exit gas space 25. The plates 22, 26 and 27 form two additional gas spaces 28 and 29 which communicate with the tubes 30 and 31. The cooling gases pass in from the space 29 down through the tubes 31 and then up through the tube 30 and out through the space 28. These gases absorb heat from the catalyst in their downward passage and give up heat to the incoming gases in tube 21 on their upward passage. In Figure 7 the tube 30 is perforated so that the downward flow does not extend all the way to the bottom of the tube 31 and some of the gas passes into the tube 30 through the perforations. This brings about a more even heating and cooling which is desirable in some cases.

The transfer of heat from the catalyst to the incoming gases in the construction shown in Figures 6 and 7 is less direct and less intense and for some purposes this is desirable, particularly where the temperature of the incoming gases is to be kept low. The cooling gases forming, as they do, a closed circuit which is isolated from the catalyst and from the incoming reaction gases, can be of any desired nature and may even, in some cases, be substituted by liquids although in general this results in too violent cooling for satisfactory operation except in case of reactions which are extremely exothermic or which must be carried out at a very low temperature. While in some cases it is desirable to provide for a gas-tight cooling circulation this is not always necessary, as in the case of cooling gases which are not harmful to the reaction, it is unnecessary to provide for complete gas-tightness and it is sufficient to keep the cooling gases at a slightly higher pressure than the reaction gases so that any leakage will result in the passage of a small amount of cooling gas into the reaction gases. In the case of cheap reaction gases which are not harmful it is, of course, not necessary to prevent leakage from the reaction into the cooling gases, although in general this is not desirable as it results in the loss of valuable reaction gases and in many cases these gases are not desirable in admixture with the cooling gases.

Figure 8:
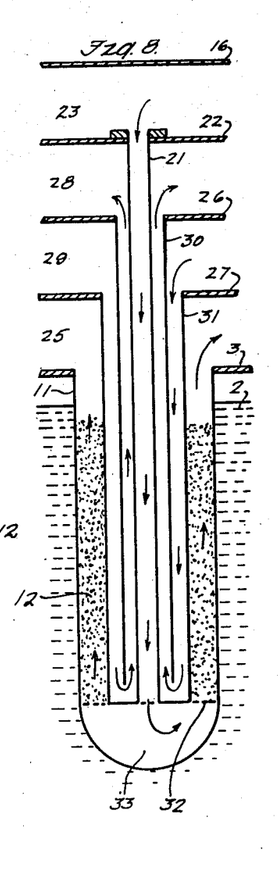

The circulation of the cooling gases may be of any desired type such as a closed circulation or an open circulation and in the case of air this latter can be effected very cheaply and simply. The heat in the cooling gases, after passing out of the converter, can be utilized in heating up incoming gases or for any other purpose for which it may be desired. The construction shown in Figure 8 is practically the same as that of Figure 6 and 7, except that the catalyst does not extend down to the bottom of the tube but is held on a perforated plate 32 so that an empty space 33 is formed at the bottom of the catalyst 12. This space serves as a mixing space for the incoming gases which pass down through pipe 21 and in some reactions such a mixing is desirable. The operation of the cooling tubes is the same as in Figure 6.

Figure 9:
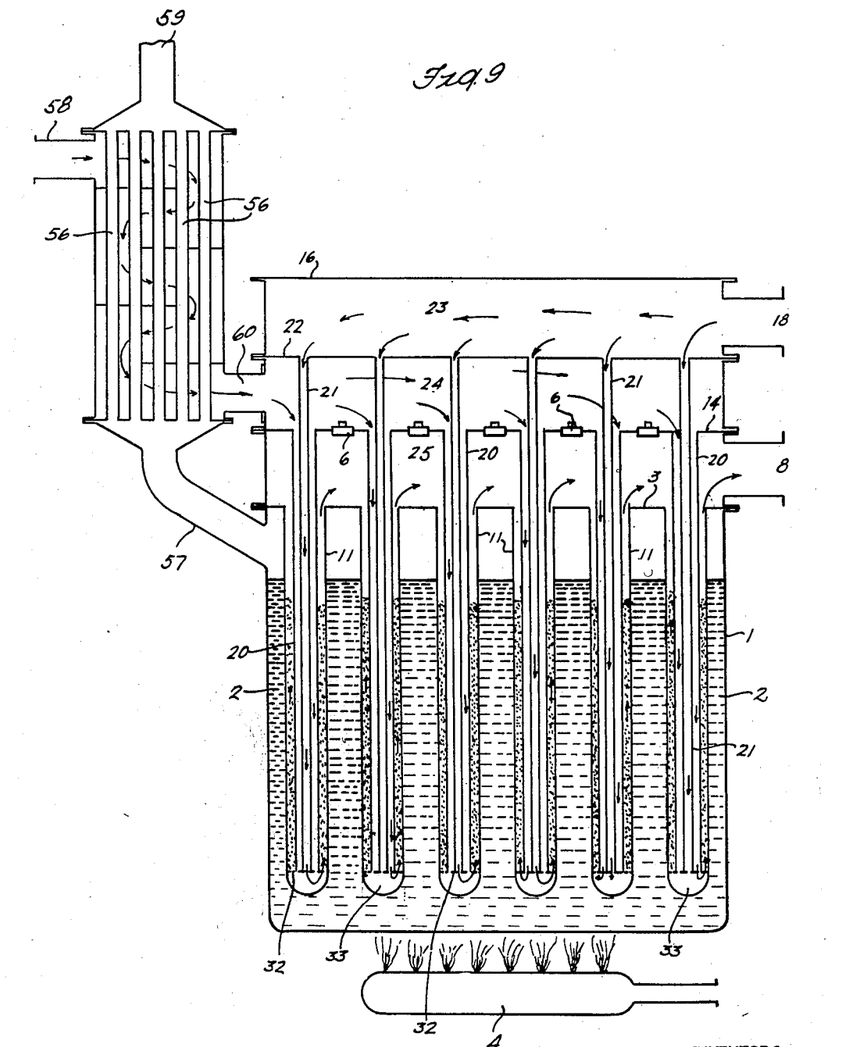
Figure 9 is a cross section through a converter having tubes of the type shown in Figure 2, associated with an external heat exchanger.

Figure 9 illustrates a converter of the general type of that shown in Figure 1 but provided with an external heat exchanger consisting in condenser tubes 56, a condenser exhaust pipe 59 and reaction gas intake mains 58 and 60. The bath is permitted to boil either due to the reaction heat or by external heat supply by the burner 4 and the vapors rising through the pipe 57 are partly or wholly condensed in the tubes 56 which are exposed to the cold reaction gases entering through the main 58 and passing over the tubes. The condensation of the bath liquid sets free a great deal of heat which serves to heat up the reaction gases which are introduced through the external tubes. Cold reaction gases are introduced through the main 18 into the gas space 23 and pass down through the central tubes. A very fine adjustment of temperature can be effected by varying the relative amounts and relative temperatures of the gases passing through the heat exchanger and those directly introduced through the main 18.

The condenser exhaust pipe 59 may lead to a further condenser in order to recover any uncondensed bath liquid or a pressure valve may be associated with the exhaust pipe in order to cause the bath to boil at a definite temperature corresponding to the pressure at which the valve is set. By this means it is possible to accurately control the temperature of the cooling bath which is desirable in many cases and also permits an automatic maintenance of bath temperature, simplifying regulation of the converter and providing for a very powerful cooling effect due to evaporation.

A higher velocity of cooling gases in converters of design similar to those in the foregoing figures, can be effected by filling the cooling gas spaces with inert material which may, for example, be in the form of rods, short tubes, granules and the like. Pieces of wire mesh are also very suitable. The nature of the material used as a filling body can be widely varied, depending on the characteristics desired. Thus, for example, material of high heat conductivity, such as fragments of metals, alloys and the like, may be used where it is desired to increase the gas velocity and at the same time to increase the heat transfer. Where the filling material is to come into contact with reaction gases it is, of course, essential that a material should be chosen which is either inert catalytically or which does not have a harmful effect on the reaction. In some cases, the filling material may advantageously be a catalyst for the reaction to be carried out, so that a portion of the reaction takes place in the cooling tubes. This, of course, results in the evolution of heat and the amount of such reaction must be adjusted so as to avoid complications due to the production of more heat than can be readily carried off by the cooling means employed. The use of filling bodies in the cooling and reaction gas tubes is also advantageous, as they prevent explosions where the reaction gases are explosible, particularly where the filling materials are of high heat conductivity, and tend to prevent local overheating. Even if explosions take place the size of the gas spaces is so decreased by the addition of filling bodies that the force of the explosion may be very greatly diminished. Explosion doors of any type may, of course, also be incorporated into the gas spaces at any desired point.

Circulation velocities in the cooling bath may also be increased in the same way by the introduction of filling bodies, preferably materials of high heat conductivity such as metals and the like.

Figure 10:
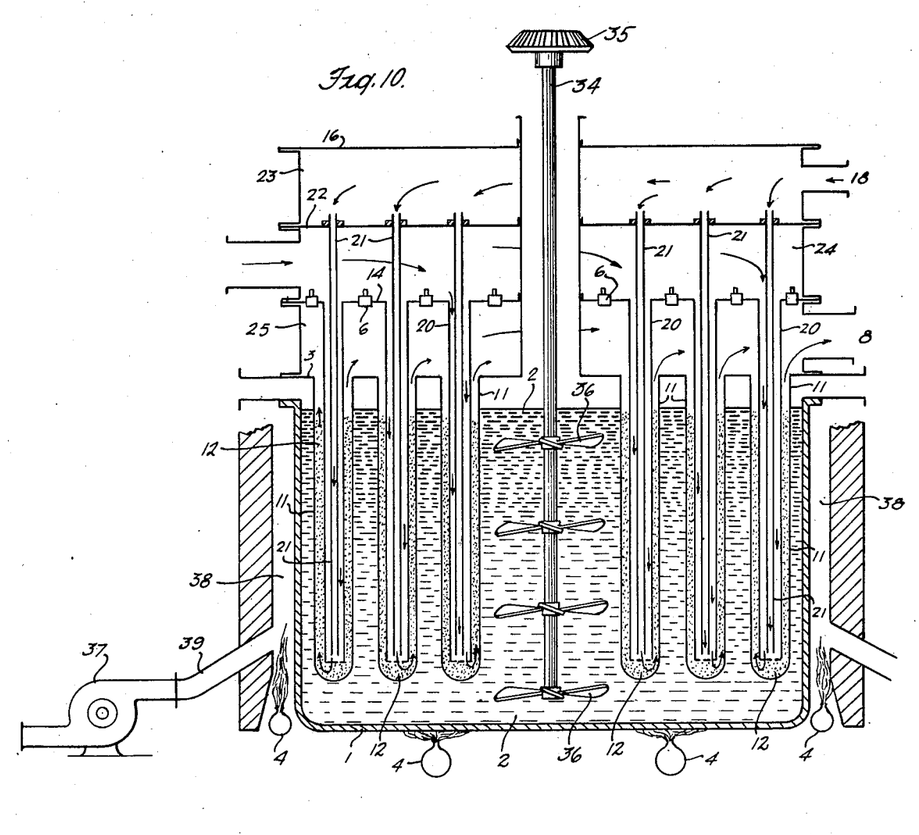
Figures 10 to 12 are cross sections through converters illustrating various bath circulating means.
Figure 11:
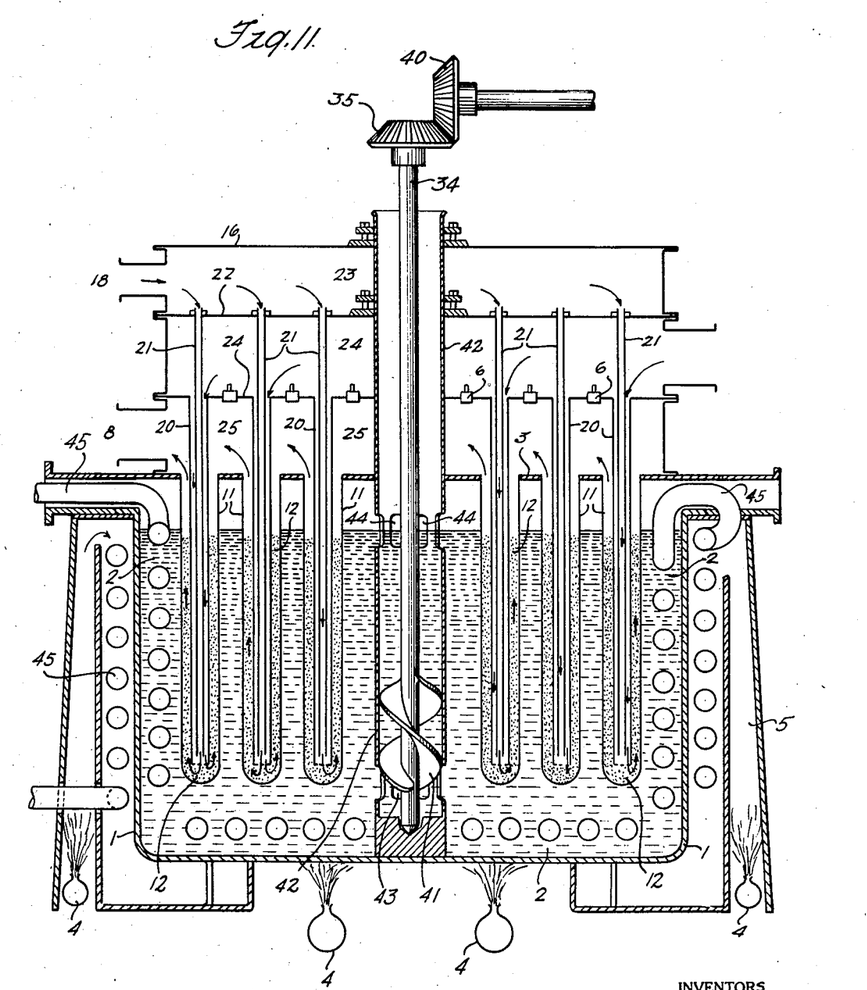
Figure 12:
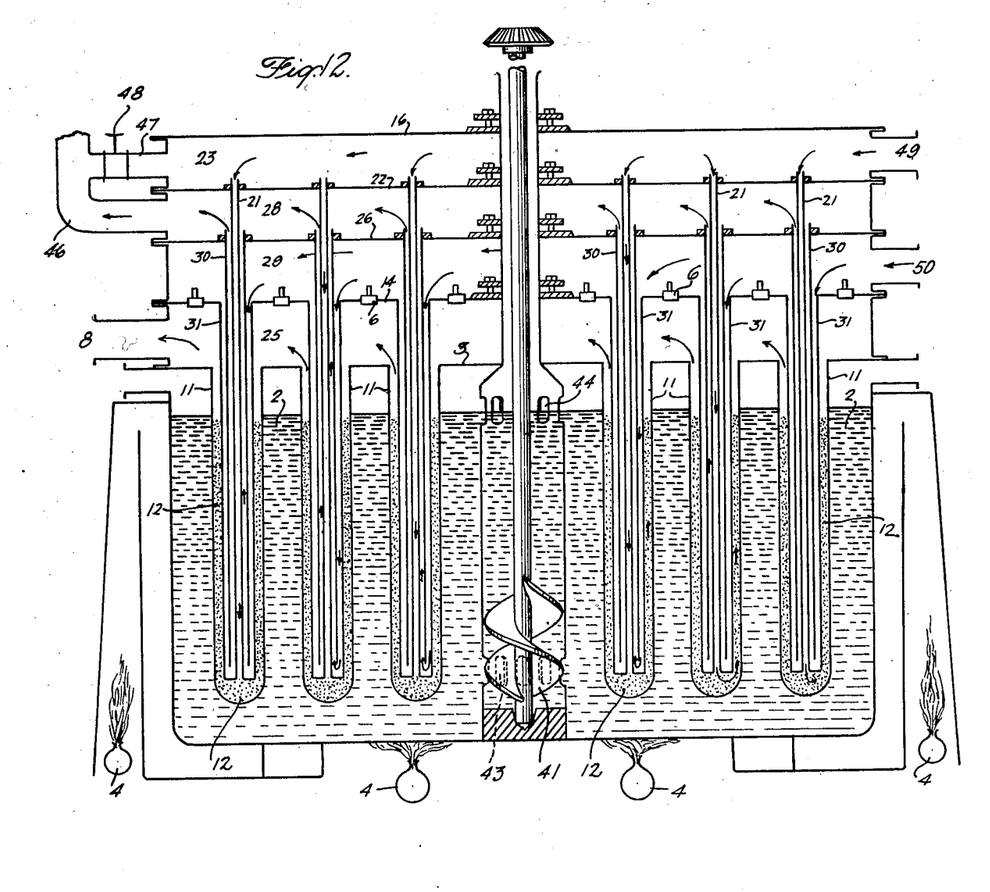

Figures 10 to 12 illustrate converters provided with means for circulating the cooling bath and also means for heating or cooling the walls of the converter. In Figure 10 the arrangement of converter tubes is the same as in Figure 2. A vertical shaft 34 provided with a gear 35 and propeller arms 36 is driven from any suitable source of power and circulates the cooling liquid upwardly in the middle of the converter and downwardly along the sides. A blower 37 is connected to a jacket 38 surrounding the converter by means of the conduit 39 and serves to effect circulation of air or other gases through this jacket. Burners 4 are provided for heating where it is necessary.

It will be seen that with this arrangement the movement of the liquid in the bath is always in the direction of its natural tendency to flow. Throughout the middle of the converter the liquid tends to rise, due to the flow of heat from the catalyst tubes. Around the sides the liquid gives up its heat to the air-cooled side walls and therefore tends to descend. This is an important feature in establishing an even and steady circulation of cooling liquid with a minimum expense of power and in maintaining the proper flow of heat from the catalyst to the bath.

In Figure 11 a somewhat different circulating means is shown, namely, a shaft 34 driven through bevel gears 35 and 40 and provided with a helical surface 41. The shaft is surrounded by a sleeve 42 which fits closely to the periphery of the helical surface 41, and is provided with perforations 43 at its lower end and perforations 44 at its upper end. The circulation is the same as in Figure 10 but is more positive as all of the liquid drawn in through the perforations 43 is carried upwardly, being confined by the sleeve. A heating coil 45 is provided which is partly in the cooling bath and partly in the heating jacket 5. Suitable cooling or heating media can be circulated through the coil by a pump or other means not shown. Where desired the coil can be incorporated in a thickened converter wall instead of being placed inside the converter shell itself. Other structural modifications will be apparent to those skilled in the art and are included.

Figure 12 illustrates a converter having a tube arrangement similar to Figure 6 and provided with a screw circulation as shown in Figure 11. The same reference characters are applied to the elements as in the figures referred to. The exit cooling space 28 is provided with an exit main 46 which has a connecting pipe 47 leading to the reaction gas intake space 23 and provided with a valve 48. When reaction gases or reaction gas ingredients are circulated as a cooling medium in the cooling tubes a certain proportion of these gases may be directly introduced into the reaction gas space and by this means their heat can be effectively conserved. A regular reaction gas intake main is provided at 49 and a cooling gas intake main at 50. The reaction gases after entering the exit gas space 25 pass out through the exit main 8.

Figure 13:
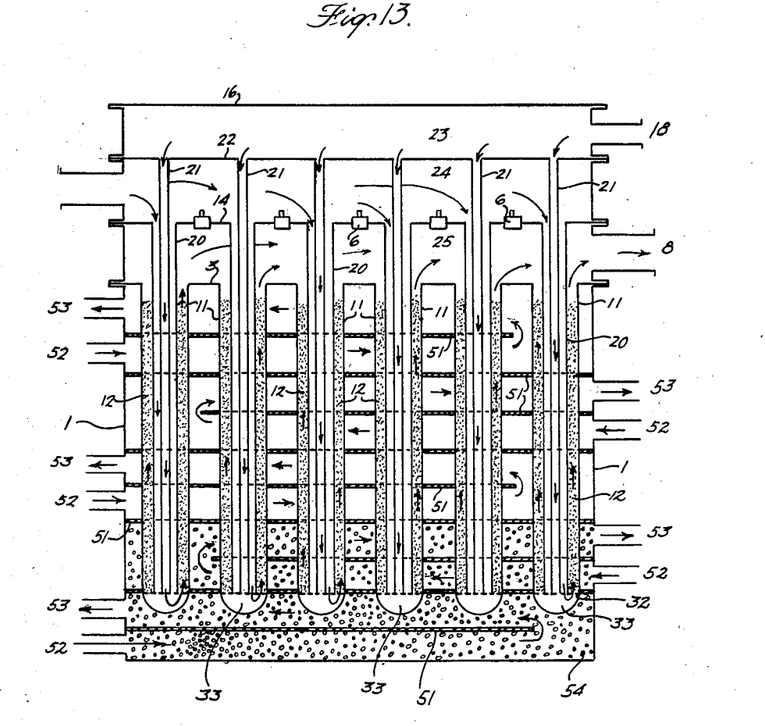
Figure 13 is a vertical cross section through a converter showing gas-cooled tubes.

Figure 13 illustrates a converter which is gas-cooled both on the inside and outside of the catalyst. The tube arrangement is the same as that shown in Figure 2 and the same parts bear the same reference characters. Instead of being provided with a cooling bath, however, the converter shell is provided with baffles 51 which divide into a number of horizontal double passageways having intake and exit mains 52 and 53. Preferably, filling bodies 54 are provided in order to increase the velocity of the cooling gases and to improve heat transfer. The converter is also shown with a perforated plate 32 at the bottom of the gas intake tubes so that mixing spaces 33 at the bottom of each of the catalyst tubes are cooled by contact with the gas circulating through the lowest cooling.

The construction of Figure 13 presents a number of advantages over the use of an external bath surrounding the whole of the catalyst. Thus, for example, it is not necessary to provide for a liquid-tight converter shell and the cooling of different horizontal zones can be varied. Thus, the amount, temperature and specific heat of the gases passing through each of the cooling passages can be varied so as to vary the cooling effect at different heights on the catalyst tubes. This provides for a very delicate control of reactions which take place very rapidly as a relatively greater cooling effect can be exerted on the lower portions of the catalyst tubes where the greatest amount of heat is generated. This is shown in Figure 13 by provision of filling bodies only in the lower two cooling passageways, the upper three cooling passageways being unobstructed. Obviously, of course, the regulation can be effected in other ways by suitable proportioning of the cooling passages and the pressures used and it may be desirable in some cases to omit the use of filling bodies altogether or to use filling bodies in all of the gas passages.

It is an advantage of the construction shown in Figure 13 that gas cooling and particularly air cooling can be utilized to take the place of a cooling bath in the case of many reactions. Important as this advantage is, however, the invention is not limited thereto and, on the contrary, if desired, liquid can be circulated in any of the cooling passages in order to bring about a greater cooling effect and particularly valuable results can be achieved by using liquid in the lower cooling passages and air or other gas in the higher cooling passages since, as has been pointed out above, the greatest heat is evolved in the bottom of the tubes where the fresh reaction gases first strike the catalyst. The advantages of horizontal sub-division with a control of cooling capacity at various horizontal levels is, of course, retained when liquid is used and is in no sense limited to air or gas cooling. An important modification consists in using moist vapors such as, for example, a mist of air and water or, in some cases, wet steam as a cooling agent, both for the outside of the catalyst in constructions similar to Figure 13 and for internal cooling, particularly in closed cooling circuits such as are shown in Figures 6 to 8. The latent heat of the moisture greatly increases the heat capacity of the gas used and effects a rapid cooling where this is desirable. Since the degree of moisture can be in most cases very easily controlled, this constitutes an additional and important method of regulating temperature and is applicable to all of the modifications of the present invention in part or in whole. Of course, where all of the external cooling gas or where a part of it is actually passed through the catalyst as, for example, in constructions such as are shown in Figures 1 to 5, it is necessary that the liquid which is present in the form of moisture should be one which is not harmful to the catalytic reaction. In some cases water, which is a very convenient cooling liquid, is harmless and even may be of advantage; in other cases, one or more of the reaction components may be present in the form of a liquid and may be evaporated in passing in heat-exchanging contact with the catalyst to mix with the rest of the reaction gases before passing through the catalyst. The use of moisture in the cooling and reaction gases thus opens up a wide field of combinations which permit achieving very desirable results in bringing about even and satisfactory cooling by means of the present invention. It is an added advantage of this feature of the invention that it adds great flexibility to the cooling due to the high latent heat of many liquids and thus adapts the present invention to a very wide field of reactions.

It should be clearly understood that the specific tube construction which is shown in the converter figures, such as Figures 9 to 13 is illustrative only and a particular tube construction does not necessarily have any particular relation to features of converter construction. Thus, for example, in Figure 10 instead of a tube construction such as that shown in Figure 2, tube constructions shown in Figures 3 to 8 can be used wherever they may prove to be desirable. The invention is also not limited to the use of a single tube construction in a single converter and, on the contrary, it may be advantageous in certain installations to use several types of tube construction. For example, in certain converters which are provided only with external cooling of the converter shell and which therefore provide a more intense bath cooling of the peripheral tubes, it may be desirable to embody closed circuit external tube constructions such as those shown in Figures 6 to 8 in some of the central tubes, whereas the peripheral tubes may well be of the similar designs shown in Figures 2 to 5, since the bath cooling on these tubes is so much more intense that it may not be necessary to provide for as great internal cooling. Other combinations of different tube types and variations may be used and are included within the scope of the invention. In general, the present invention is extremely varied in its application and a skilled converter engineer will, of course, proportion his structure and choose his structural elements including the particular modification of the present invention which will give the best result in any particular installation. The number of combinations is infinite and only a few have been illustrated but, of course, the invention is not limited thereto and is of general application to converters for vapor phase catalytic reactions.

Figure 14:
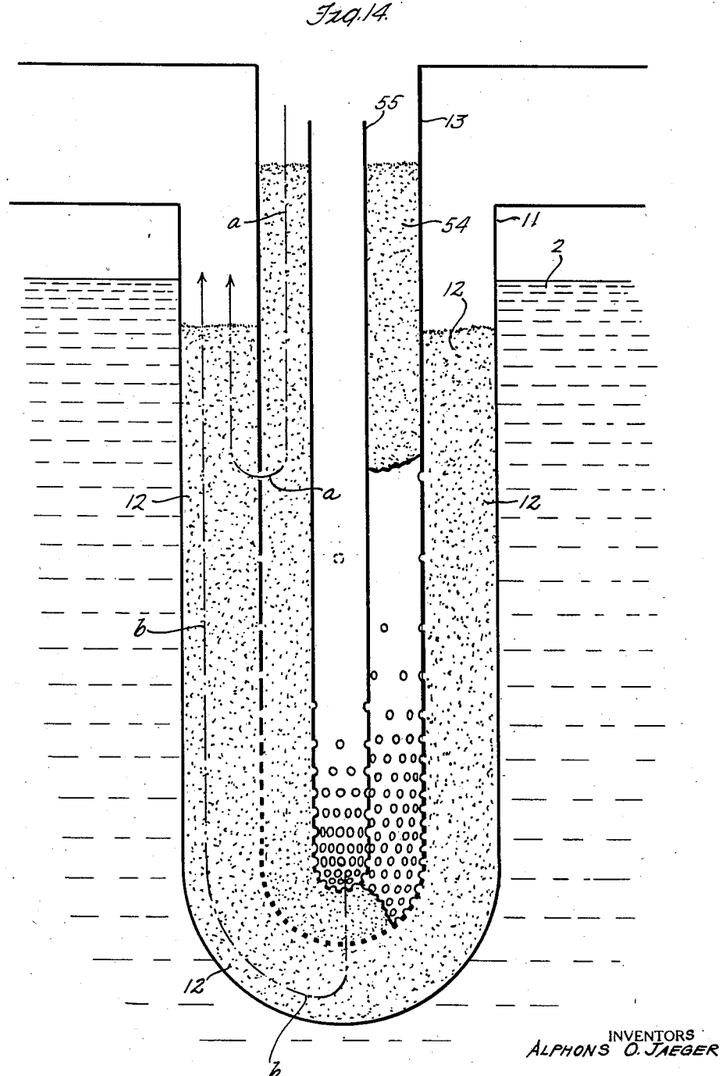
Figure 14 is a detailed vertical cross section through a catalyst tube showing a modified form of gas distribution.

Figure 14 shows a tube construction which is in some ways similar to that of Figure 2 but which provides for an additional annular layer of granular material which is shown at 54. This material fills the space between the gas inlet tube 13 and a central tube 55. Both the tubes 55 and 13 are perforated and the incoming gases are therefore presented with various possible baths which may be wholly through the annular space between the tubes 55 and 13 or partly through the unobstructed tube 55 and through the annular space 54. Two gas paths are shown by broken arrows a and b. The material in 54 is preferably an inert material such as sand and the like, although in some cases it may advantageously possess catalytic activity. It is desirable to so adjust the resistance to gas travel through various paths as to make it approximately equal for all paths in order to prevent an undue proportion of the reaction gases passing through certain zones. For this purpose, the perforations in tubes 55 and 13 are generally increased in number toward the bottom, as is shown in the right-hand portion of the space 54, where the sand is shown as broken away for a portion of its depth in order to illustrate the placement of perforations. The granule size of the material in 54 may also be varied so as to bring about an even gas flow. The construction shown in Figure 14 provides for a very intimate mixture of the reaction gases entering and also breaks up the reaction gas stream very thoroughly so that it passes into the catalyst in very fine streams and a local overheating or overcooling is thus prevented in a very effective manner. The cooling effect, particularly where the filling material in 54 is a good conductor of heat, is very uniform and this type of tube structure can be used with effect in many reactions which are exceedingly delicate in character.

In some cases, particularly where a reaction takes place in two stages, the first stage of which may be endothermic or only very slightly exothermic and the second stage strongly exothermic, two different catalysts may be employed, the catalytic material in space 54 favoring the endothermic reaction, whereas the catalyst 12 catalyzes the exothermic reaction. Such an arrangement effects a very desirable temperature control by balancing the two reactions with their different heat requirements against each other and a relatively long gas transfer in contact with the different catalysts is possible in a comparatively small space. Other modifications of this method will immediately suggest themselves to the skilled chemist and engineer, such as, for example, arranging more than two catalysts in series where a reaction takes place in more than two stages and the like.

In the foregoing description of a few modifications and structural embodiments of the principles of the present invention the cooling bath has not been specifically described. The materials which constitute the bath are most varied and in general any suitable liquid can be used. Various means of controlling bath temperature, some of which are well known per se may be utilized in converters of the present invention. Thus, for example, baths having a boiling point at or about the temperature at which the catalytic action is to take place may be used and temperature regulation due to the latent heat of evaporation may be effected. A structure such as that illustrated in Figure 9 is very suitable for this type of control, as the external heat exchanger will serve as an efficient condenser for the evaporating cooling fluid and at the same time will heat up the incoming reaction gases. Other modifications such as cooling baths boiling in various pressures and the like which are known in the art can be used in order to effect the desired external cooling in the present invention. In fact, any of the structural or operational features which are well known in the converter art may be used in the present invention in so far as they are applicable to structures embodying its principles and in the adaptation of the present invention to any particular installation or any particular plant, the man skilled in the art will, of course, utilize such structural features as are known in the art which may be desirable in order to permit thorough utilization of the advantages of the present invention.

In connection with the short descriptions of operations of the various modifications shown in the drawings, a single reaction has been referred to or a single series of reactions. This is in no sense the only process to which the principles of the present invention can be applied although, in most cases, it is probably the most important type of process. It is perfectly practical to carry out several separate reactions in a single converter embodying the tube structure of the present invention by dividing the gas intake spaces into suitable separate compartments. Such an arrangement is of advantage in some cases, particularly where both exothermic and endothermic reactions are to be carried out or where one of the reactions is only slightly exothermic and requires additional heat. Thus, for example, a strongly exothermic reaction can be caused to take place in alternate tubes in a converter and an endothermic or only slightly exothermic reaction can be caused to take place in neighboring tubes. A very effective cooling results as the bath which is heated by the exothermic reaction tubes gives off its heat to the endothermic reaction tubes and in this way one reaction can be used to supply heat for the other. In the same way, in tube constructions such as shown in Figures 6 to 8, a series circulation of the cooling gases can be provided so that the hot gases from the exothermic tubes will circulate down through the endothermic tubes, where they are cooled and then again pass through the exothermic tubes. Other and further combinations which may be desirable in some cases will occur to those skilled in the art and are intended to be included within the scope of the present invention.

What is claimed as new is—

1. A vapor phase catalysis which comprises passing a reaction gas in direct heat exchanging relation with the inner wall of a catalyst annulus, reversing the flow of gas and causing it to pass through the catalyst annulus in an axial direction during the reversed flow, passing additional reaction gas directly through the catalyst annulus without being first circulated in direct heat exchanging relation thereto, and subjecting the outer surface of the catalyst annulus to heat exchange with a liquid heat exchanging medium.

2. The method of vapor phase catalysis which comprises subjecting the inner surface of a catalyst annulus to direct heat exchange with a heat-exchanging medium which is kept out of contact with the catalyst, passing reaction gases out of direct heat-exchanging relation with the catalyst annulus but in direct heat-exchanging relation with said heat-exchanging medium, thereupon reversing the flow of the reaction gases and passing them through the catalyst annulus in axial direction and subjecting the outer surface of the catalyst annulus to heat exchange with a heat exchange medium.

3. A catalytic apparatus comprising in combination a converter chamber, a heat-exchanging bath in said chamber, a gas impervious partition above said chamber, closed tubes extending downwardly through said partition, an annular catalyst charge around the inner walls of said tubes, and at least one tube extending through the center of the catalyst annulus and being connected to a source of reaction gas, said tube being perforated for a substantial distance in contact with the catalyst.

4. A catalytic apparatus comprising in combination a converter chamber, a heat exchanging bath in said chamber, a gas impervious partition above said chamber, closed tubes extending downwardly through said partition, an annular catalyst charge around the inner walls of said tubes, a plurality of reaction gas sources above said gas impervious partition and a plurality of concentric tubes connected to said gas sources and extending downwardly through the centers of said catalyst annuli.

5. A catalytic apparatus comprising in combination a converter chamber, spaced for a cooling medium therein, a gas impervious partition thereover, closed tubes extending downwardly through the partition into the converter chamber, a gas impervious partition above said first partition, perforated closed end tubes extending downwardly from said latter partition and into the closed tubes from the first partition, a catalyst charge in the annular space defined between the two closed end tubes, a concentric closed end tube extending downwardly into the second tube and defining therewith, an annular space, finely divided material in said annular space, and means permitting gases from said third tube to pass outwardly into said finely divided material.

6. A catalytic apparatus comprising in combination a converter chamber, spaced for a cooling medium therein, a gas impervious partition thereover, closed tubes extending downwardly through the partition into the converter chamber, a gas impervious partition above said first partition, perforated closed end tubes extending downwardly from said latter partition and into the closed tubes from the first partition, a catalyst charge in the annular space defined between the two closed end tubes, a concentric closed end tube extending downwardly into the second tube and defining therewith an annular space, finely divided catalytically active material in said annular space, and means permitting gases from said third tube to pass outwardly into said finely divided material.

7. A catalytic apparatus comprising in combination a converter chamber, spaced for a cooling medium therein, a gas impervious partition thereover, closed tubes extending downwardly through the partition into the converter chamber, a gas impervious partition above said first partition, perforated closed end tubes extending downwardly from said latter partition and into the closed tubes from the first partition, a catalyst charge in the annular space defined between the two closed end tubes, a concentric closed end tube extending downwardly into the second tube and defining therewith an annular space, finely divided material in said annular space, the perforations in the second tube and the gas resistance of the finely divided material and the catalyst being so proportioned as to provide a substantially uniform resistance for gases passing downwardly through the second or third tubes, and means permitting gases from said third tube to pass outwardly into said finely divided material.

8. A catalytic converter comprising a converter chamber, a plurality of substantially vertical catalyst compartments within said chamber, a fluid temperature regulating medium surrounding said compartments, and at least one horizontal baffle fitting around at least part of said compartments sufficiently closely to prevent longitudinal travel of said temperature regulating medium along said compartments, said baffle being sufficiently smaller in area than the horizontal cross-section of the converter to cause the temperature regulating medium to pass vertically through at least one restricted free space.

9. A method of carrying out exothermic organic, vapor phase catalyses, which comprises passing the reaction mixture at reaction temperature through a plurality of substantially vertical catalyst containing compartments located in a converter shell and circulating a fluid temperature regulating medium over said catalyst compartments, the flow being baffled at at least one point by at least one substantially horizontal baffle fitting sufficiently tightly around at least part of the catalyst containing compartments to substantially prevent vertical flow of the fluid temperature regulating medium through the baffle at this point.

10. A method of carrying out vapor phase, catalytic oxidations of organic compounds, which comprises passing the reaction mixture at reaction temperature through a plurality of substantially vertical catalyst containing compartments located in a converter shell and circulating a fluid temperature regulating medium over said catalyst compartments, the flow being baffled at least one point by at least one substantially horizontal baffle fitting sufficiently tightly around at least part of the catalyst containing compartments to substantially prevent vertical flow of the fluid temperature regulating medium through the baffle at this point.

Signed at St. Louis, Missouri, this 16th day of July 1926.

ALPHONS O. JAEGER.